United States Patent
Young

[11] 4,149,780
[45] Apr. 17, 1979

[54] VARIABLE DENSITY SUNGLASSES COMPRISING LIGHT POLARIZING ELEMENTS

[75] Inventor: Michael A. Young, Brookline, Mass.

[73] Assignee: Polaroid Corporation, Cambridge, Mass.

[21] Appl. No.: 810,995

[22] Filed: Jun. 29, 1977

[51] Int. Cl.² ............................................. G02C 7/12
[52] U.S. Cl. ........................................ 351/49; 350/159
[58] Field of Search ........................... 351/49; 350/159

[56] References Cited

U.S. PATENT DOCUMENTS

| | | | |
|---|---|---|---|
| 2,298,058 | 10/1942 | Land | 351/49 |
| 2,370,697 | 3/1945 | Tillyer | 351/49 X |
| 2,565,362 | 8/1951 | Eloranta | 351/49 |

Primary Examiner—Paul A. Sacher
Attorney, Agent, or Firm—Louis G. Xiarhos; Sheldon W. Rothstein

[57] ABSTRACT

Variable density spectacles comprising a pair of superposed iodine stained light polarizing elements, one of such elements being rotatable through an arc of less than 90 degrees to provide changes in the light transmitting functionality of the superposed elements; each of said elements having a light transmittance of from about 42 to 44 percent.

6 Claims, 3 Drawing Figures

U.S. Patent    Apr. 17, 1979    Sheet 1 of 2    4,149,780
FIG. 1
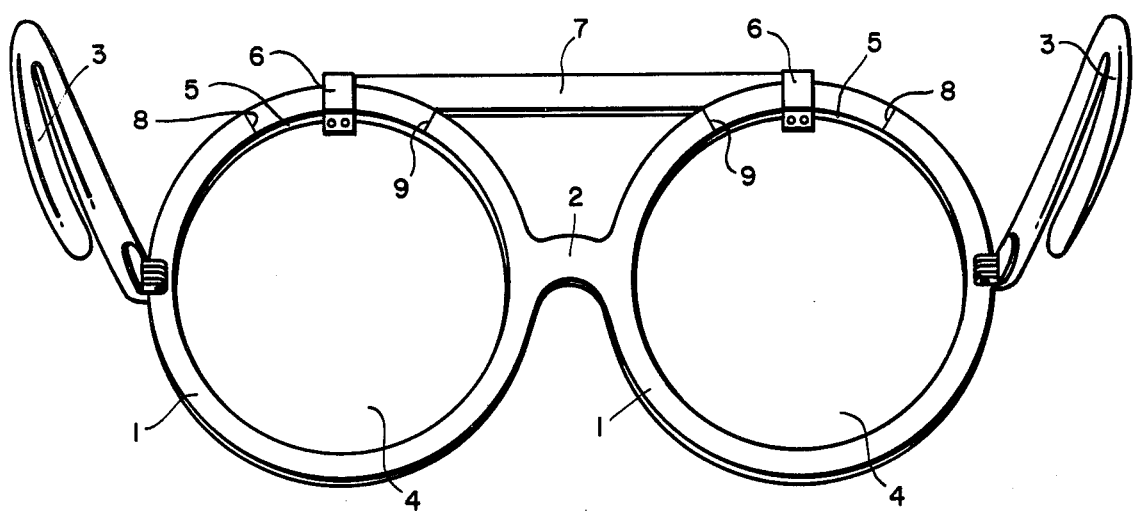
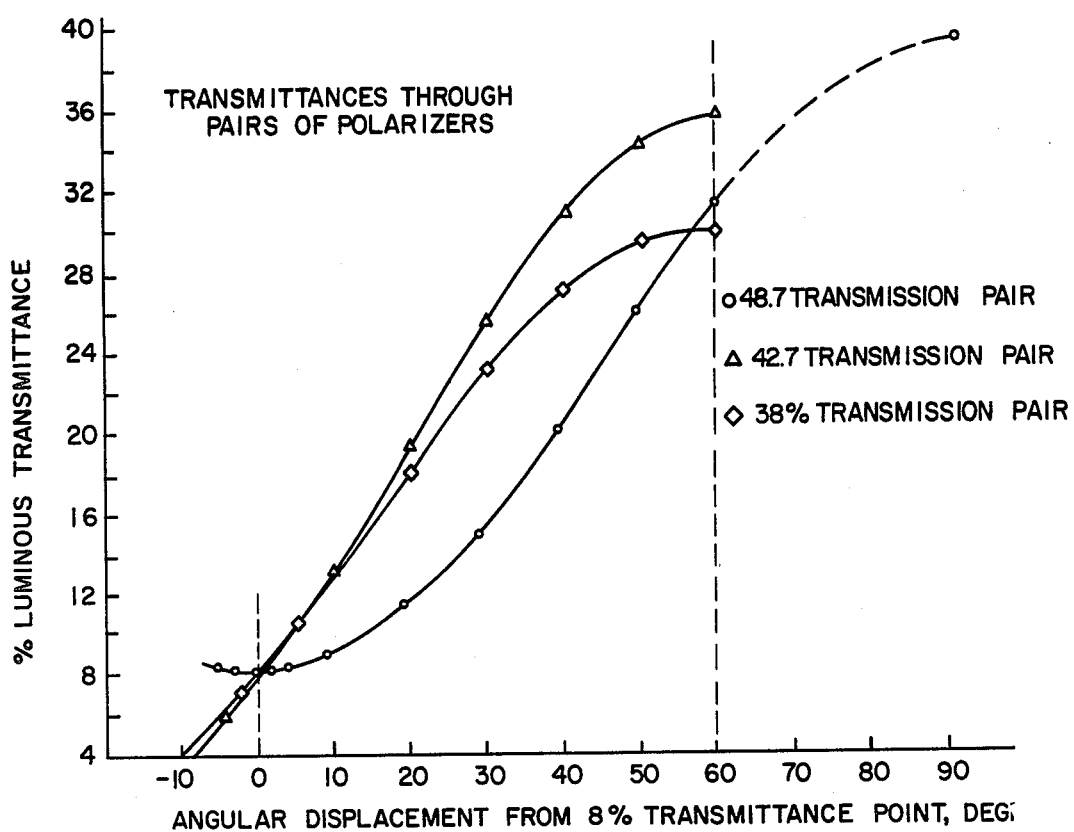
FIG. 2

VARIABLE DENSITY SUNGLASSES COMPRISING LIGHT POLARIZING ELEMENTS

BACKGROUND OF THE INVENTION

The present invention is directed toward an ophthalmic device comprising superposed pairs of particular light polarizing elements; one of such pairs being fixedly retained in a frame member while the elements of the other such pair are rotatable.

The concept of providing variable light transmission characteristics to an ophthalmic device by employing light polarizing elements which may be rotated with respect to each other is not itself new. For background information on systems of this type, reference should be had to U.S. Pat. No. 2,005,246 issued to Edwin H. Land on June 18, 1935; U.S. Pat. No. 2,251,330 issued to Murray N. Fairbank on Aug. 5, 1941; and U.S. Pat. No. 2,565,362 issued to Vaito K. Eloranta on Aug. 21, 1951. See also copending and now allowed U.S. patent application Ser. No. 608,401, U.S. Pat. No. 4,119,369, filed on Aug. 27, 1975 in the names of Eloranta et al. which describes a particular arrangement of light polarizing elements in an ophthalmic device to provide variable density light polarizing functionality.

The most widely used type of synthetic light polarizer is the polyvinyl alcohol-iodine complex polarizer. It consists of linear polyiodides contained within the polyvinyl alcohol helix. By orienting the polyvinyl alcohol matrix unidirectionally the transmission moments of the absorbers are also so oriented and the material becomes dichroic.

The manufacture of iodine stained dichroic light polarizing elements, which involves stretching polyvinyl alcohol and subsequently dyeing the material with a dichroic stain, iodine, is well known and is disclosed, for example, in U.S. Pat. No. 2,237,567 of Edwin H. Land issued on Apr. 8, 1941. In accordance with that patent it is disclosed that a cast sheet of polyvinyl alcohol is first formed from an aqueous solution of the material. The dried cast sheet is then heated to a temperature at which it can be extended by stretching, preferably in a moist atmosphere. It is further disclosed in that patent that the stretched sheet may be bonded to a protective layer after the stretched sheet is cooled. Dichroic stain may be applied to one or both surfaces of the stretched sheet.

In a later patent issued to Alexander Thomas on May 15, 1945, U.S. Pat. No. 2,375,963 an improvement in the process of making an iodine stained polarizer is described and essentially comprises washing the polarizer after the step involving staining with iodine. This results in removing uncombined iodine and forming a more stable product.

A further improvement in the above light polarizing element is explained in U.S. Pat. No. Re. 23,297 issued on Nov. 28, 1950 to Mark Hyman, Jr. et al. That improvement comprises a protective surface layer on the iodine stained polyvinyl alcohol polarizer. That surface layer comprises an ester of polyvinyl alcohol, the ester being of a polybasic acid or a derivative of such an acid, particularly an inorganic polybasic acid, and more particularly boric acid, thereby providing a polyvinyl borate. The borating step is disclosed to provide greatly improved stability to the light polarizer not only against heat but also against moisture and ultra violet radiation. It is accomplished by treating the stained polarizing element with a boric acid solution. Specifically the ester formed on the surface of the light polarizer is believed to be polyvinylorthoborate.

A further improvement in the preparation of iodine stained polarizers is described in U.S. Patent Application Ser. No. 810,996 of Norman Schuler filed on June 29, 1977 and now abandoned in favor of copending continuation application, U.S. Ser. No. 900,728, filed Apr. 27, 1978. That application describes adding a zinc salt and potassium iodide to the borating solution in order to provide good blue absorption and stabilize the dichromophore responsible for red light absorption. An iodine stained polarizer as described and preferably one manufactured with zinc ion in borating solution as described above is employed in the present invention.

In order to produce light polarizing ophthalmic devices which may be employed, for instance, as variable density sunglasses, cautions must be observed to prevent the user from accidently rotating the absorption axis of the rotatable polarizer into the normal position with respect to the absorption axis of the fixed polarizer which would produce substantial light extinction; that is the viewer would suddenly be thrust into a blind condition. It has been found that for driving safety the density of sunglasses should not go below about 6 to 10 percent transmission and preferably should go no lower than about 8 percent transmission. Furthermore in order to provide effective sunglass functionality when the absorption axes of the rotatable and fixed light polarizers are substantially parallel the light transmission of the "open" system should be on the order of 35 to 40 percent. All this is desirably accomplished while maintaining the primary functionality of light polarizing ophthalmic devices, that is reducing specular glare. Preferably specular glare is to be held to within about 1 percent leakage in all attitudes of rotation of the rotatable lens.

Given these considerations it appears evident that in a system even where a full 90° of rotation is available for rotatable lenses, among effects which will be achieved when the polarizers are in the crossed position, that is when the absorption axes of the fixed and rotatable lenses are normal to one another, the transmission of incident radiation through the pair will be on the order of about 8 percent. Unfortunately as the rotatable lens is rotated through an arc of less than 90°, from the crossed position e.g., through an arc on the order of about 60°, it is found that light transmission through the lenses is too low to be effectively employed in a commercial variable density sunglass product. In other words, a higher degree of rotation is required in order to get the respective absorption axes sufficiently close to a parallel position to give effective "open" transmissivity of over about 35 percent.

For a recitation of the manufacturing details of iodine stained polarizers useful in the present invention reference should be had to the aforementioned copending application Ser. No. 900,728. The light transmissivity of an individual light polarizing element is governed by the amount of iodine absorbed by the polyvinyl alcohol matrix which is in turn a function of the residence time of the polyvinyl alcohol film in the iodine bath and the concentration of the bath. By adjusting residence time and/or concentration, various densities or light transmissivity characteristics of polarizers can be achieved. Taking the obvious approach to producing polarizers for employment in the present invention, elements with a high initial transmissivity on the order of about 48 percent were prepared and found to permit approximately 8 percent light leakage or transmissivity when their absorption axes are in the cross position. Unfortunately, however, when used in a rotatable system in which the degree of rotation of the rotatable lens is held to on the order of about 60°, only about 30 percent transmission in the full open position could be obtained. Likewise it was found that with polarizers of such high transmissivity in the crossed position more than 5 percent glare leakage occurred with about ¾ of a percent glare leakage in the open position; 5 percent glare leakage being unacceptable. Open position glare leakage is lower than closed position glare leakage due to the fact that in the open position both absorption axes, that is the absorption axis of the rotatable and fixed lenses, are generally horizontal and near parallel, thereby fortifying each other and substantially eliminating specular glare. However, in the closed position the absorption axis of the rotatable lens closer to a vertical attitude with respect to the horizontal absorption axis of the fixed polarizer and accordingly cannot aid in glare removal.

With a higher density, for example, a polarizer which passed only 38 percent of incident light, it was found that glare leakage is below 1 percent. However, "open" or parallel axes transmissivity of the lens pair is under 30 percent making it generally unacceptable in a commercial product. Various empirical experiments have shown that maximum transmissivity in a variable density light transmitting ophthalmic device, when the respective absorption axes are angularly related to each other by 60° plus the angle between the absorption axes which results in 8 percent transmission, is achieved when the superposed lenses comprise polarizers having individual transmissivities on the order 45.3 percent. The obvious conclusions that such a polarizer would produce optimal results when employed in a system of the type described have turned out to be fallacious as unacceptable parallel position glare leakage results. It has been discovered that if one selects lens pairs with a single lens transmissivity less than 45.3 percent, on the order of 42-44 percent, a parallel axes lens pair transmissivity of between over 35 percent results. The lenses comprising such polarizers will provide, in all attitudes, glare reduction of less than about 1 percent and when the rotatable lens is rotated about 60° from the 8 percent transmission position, nearly maximum transmittance is obtained with these polarizers.

BRIEF DESCRIPTION OF THE DRAWINGS

FIG. 1 is a rear perspective view of a pair of exemplary spectacles of the present invention;

FIG. 2 is a graphical depiction of luminous transmittance of pairs of polarizers of various individual transmittances plotted as a function of angular displacement of the absorption axis of one of such polarizers versus the other polarizer of such pair.

DETAILED DESCRIPTION OF THE DRAWINGS

Figure 3:
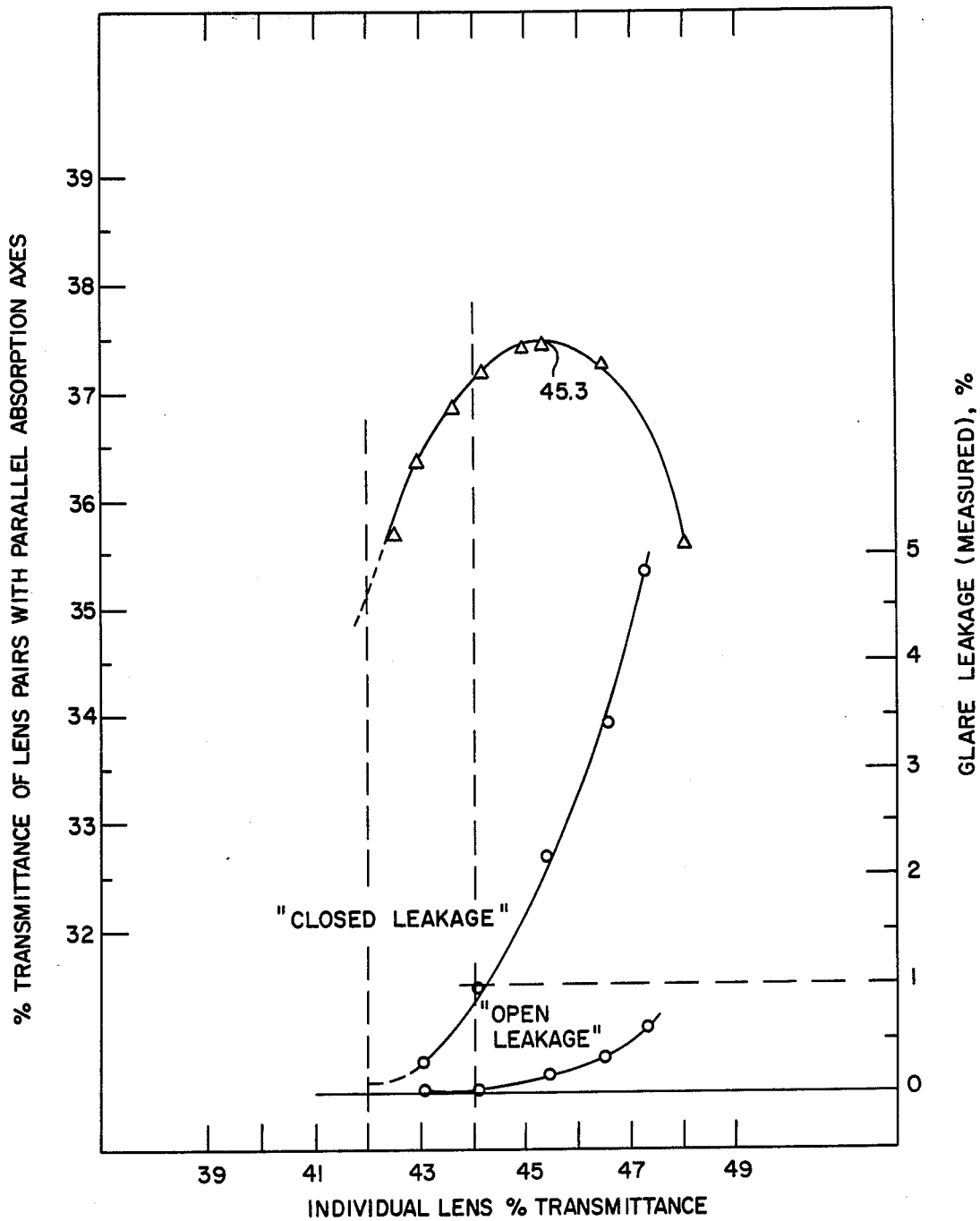
FIG. 3 is a graphical depiction of transmittance of pairs of polarizers of various individual transmittances in the open or parallel absorption axes position versus individual lens transmittances. Also depicted on the same graph are "open" and "closed" position percent glare leakages.

Referring first to FIG. 1 of the drawings a rear view of exemplary spectacles useful with the present invention is shown. Frame members 1 are suitable eyeglass frame elements connected by bridge 2 and are capable of fixedly retaining light polarizing lenses 5. Temples 3 are connected to lens retaining members 1 and are employed in conventional fashion by being secured over the ears of a wearer. Biasing means 6 are connected to rotating light polarizing lenses 4 as is described in the aforementioned copending U.S. Application Ser. No. 608,401. Tie bar 7 extends between biasing means 6 so that rotation of lenses 4 will be uniformly accomplished as the tie bar is actuated. Rotation stops 8 and 9 prevent movement of the lenses beyond that point where the mechanical arrangement of the rotatable lenses and tie bar would interfere with the field of vision of the wearer or cause binding. In accordance with the present invention lenses 4 and 5 comprise iodine stained polyvinyl alcohol polarizers having individual transmittances between about 42 and 44 percent.

Referring now to FIG. 2, pairs of polarizers having transmittances of about 48.7 percent, 42.7 percent and 38 percent were prepared using the method disclosed in the aforementioned copending patent application Ser. No. 900,728. The various transmittances were achieved by holding constant at 15 seconds the residence time of the polyvinyl alcohol sheet in the iodine stain solution and by adjusting the concentration of iodine and potassium iodide in the stain solution. The molar ratio of potassium iodide to iodine was approximately 25 in each case and the concentration of iodine in the stain baths utilized in producing the 48.7, 42.7, and 38 percent transmitting polarizers was 0.004, 0.009, and 0.020 molar, respectively. In all cases the stained sheet was exposed to a borating bath comprising boric acid, potassium iodide, zinc chloride and water in a weight ratio of 1.25/1.95/1/25.67, as described in the aforementioned copending application Ser. No. 900,728. After the polarizers were dried, they were associated in pairs and the absorption axis of each polarizer of the pair was related to the absorption axis of the other polarizer of the pair at the angular relationship at which 8 percent transmissivity of light through the polarizer pairs was achieved. This is considered the zero point. From that point the absorption axis of one polarizer was rotated a total of 60° and that angular displacement from the 8 percent transmittance point was plotted against luminous transmittance. In the system which one would consider ideal in the present invention that is a system at which 8 percent transmittance is achieved in the crossed position, which is noted for the 48.7 percent transmittance polarizers, when 60° of angular rotation has been completed, it is evident from the slope of the curve that it provides no where near the maximum transmittance possible with the lens pair. The curve measured up to the 90° point indicates that maximum transmittance is over 39 percent, while at 60° degrees of rotation only about 31 percent transmittance is achieved.

With the pair of 38 percent transmissive polarizers

With the pair of 38 percent transmissive polarizers clearly the plateau area is reached at about 60 degrees of rotation from the 8 percent transmittance point and apparently maximum transmittance in the system described is achieved at about 30 percent.

With the polarizers having an individual transmittance of 42.7 percent the curve is nearly plateaued as it crosses the 60 degree rotation point and gives a transmittance of about 36 percent.

Referring now to FIG. 3, test pairs of lenses having various individual transmittances were prepared as described above and were plotted as a function of transmittance when the absorption axes are displaced 60 degrees from the 8 percent transmittance position. Peak transmittance was achieved with polarizers having individual transmittances of about 45.3 percent. However, it can be seen that with transmittances of 45.3 percent, "closed position glare leakage", that is, evident specular glare when the transmittance is eight percent, is on the order of about 2 percent, which is unsatisfactory. In order to achieve the parametric considerations defined above, the iodine stained polarizers of the variable light transmissive spectacles of the present invention must have individual transmissivities of between about 42 and 44 percent, as is indicated by the dotted lines.

Polyvinyl alcohol film polarizers of the type employed herein generally comprise a suitable isotropic plastic support, as disclosed in U.S. Pat. No. 2,237,567, which is preferably cellulose acetate butyrate. The support gives the light polarizing film dimensional stability and serves as a protective element. As is disclosed in U.S. patent application Ser. No. 900,728, referred to above, the lamination of the polarizer to cellulose acetate butyrate support elements may be accomplished by means of a suitable adhesive, e.g. one comprising polyvinyl alcohol, methanol, a crosslinking agent and water. The outside surfaces of one or both cellulose acetate butyrate elements may have coated thereon a mar resistant coating as is disclosed, for example, in U.S. Pat. No. 3,097,106. Furthermore they may have absorbed therein or coated thereon a suitable infra-red absorbing material as disclosed in U.S. Pat. Nos. 3,588,216 and 3,687,862.

It can be seen therefore that employing pairs of polarizers in variable light transmissive spectacles with individual transmittances above that of the polarizers of the present invention gives unsatisfactory results, and employing pairs of polarizers with individual transmittances below the polarizers of the present invention give unsatisfactory results.

Throughout the specification reference has been made to transmittances through single and paired polarizers. Such transmittances results from adsorbed dichroic stain and not from other materials which might be employed to achieve cosmetic, or other effects.

Since certain changes may be made in the above product and process without departing from the scope of the invention herein involved, it is intended that all matter contained in the above description or shown in the accompanying drawings shall be interpreted as illustrative and not in a limiting sense.

What is claimed is:

1. In variable light transmissive spectacles comprising two pairs of superposed light polarizing lenses, one lens of each pair being rotatable with respect to the other through an arc of less than ninety degrees from a first position where low light transmittance through the lens pair is obtained, to a second position where high light transmittance through the lens pair is obtained;

the improvement wherein the individual light polarizing lenses of each said pair have a light transmittance between about 42 and 44 percent and the light transmittance through each said lens pair when said rotatable lenses are in said first position is six to ten percent; light transmittance through each said lens pair when said rotatable lenses are in said second position is over thirty five percent; and glare leakage through each pair is less than one percent at all positions of rotation of said rotatable lens.

2. The spectacles of claim 1 wherein each rotatable lens is rotatable through an arc of about sixty degrees.

3. The spectacles of claim 1 wherein said light polarizing lenses comprise iodine-stained polyvinyl alcohol.

4. The spectacles of claim 3 wherein said light polarizing lenses includes a red dichromophore- stabilizing zinc salt.

5. The spectacles of claim 1 wherein at least one lens of each lens pair includes an infrared radiation absorber.

6. The spectacles of claim 3 wherein each of said light polarizing lenses comprises an iodine-stained polyvinyl alcohol polarizer treated with a borating bath comprising boric acid, potassium iodide and a red dichromophore-stabilizing zinc salt.

* * * * *